United States Patent
Wang et al.

(10) Patent No.: US 8,552,993 B2
(45) Date of Patent: Oct. 8, 2013

(54) LIQUID CRYSTAL DISPLAY APPARATUS WITH TOUCH INPUT FUNCTION

(75) Inventors: Chao Chen Wang, Hsin-Chu (TW); Yao Jen Hsieh, Hsin-Chu (TW); Heng Sheng Chou, Hsin-Chu (TW); Pang Chiang Chia, Hsin-Chu (TW); Yuet Ping Lee, Hsin-Chu (TW); Kuang Yu Fu, Hsin-Chu (TW); Chun Pi Wang, Hsin-Chu (TW)

(73) Assignee: Au Optronics Corporation, Hsinchu (TW)

( * ) Notice: Subject to any disclaimer, the term of this patent is extended or adjusted under 35 U.S.C. 154(b) by 797 days.

(21) Appl. No.: 12/395,343

(22) Filed: Feb. 27, 2009

(65) Prior Publication Data

US 2010/0127993 A1  May 27, 2010

(30) Foreign Application Priority Data

Nov. 21, 2008 (TW) .............................. 97145046 A

(51) Int. Cl.
*G06F 3/041* (2006.01)

(52) U.S. Cl.
USPC ............... 345/173; 345/87; 345/92; 345/179; 200/500

(58) Field of Classification Search
USPC ...................... 345/173, 87, 92, 179; 200/500
See application file for complete search history.

(56) References Cited

U.S. PATENT DOCUMENTS

| 4,429,413 | A  | * | 1/1984  | Edwards ........................ 382/124 |
|-----------|----|---|---------|------------------------------------------|
| 7,009,663 | B2 | * | 3/2006  | Abileah et al. .................. 349/12  |
| 7,071,905 | B1 | * | 7/2006  | Fan ................................. 345/76 |
| 2006/0077186 | A1 |   | 4/2006  | Park et al. ...................... 345/173 |
| 2006/0262099 | A1 | * | 11/2006 | Destura et al. ................. 345/173 |
| 2007/0120789 | A1 | * | 5/2007  | Lee et al. ......................... 345/87 |
| 2008/0018613 | A1 | * | 1/2008  | Kim et al. ...................... 345/173 |
| 2009/0096764 | A1 | * | 4/2009  | You ................................... 345/174 |
| 2009/0115741 | A1 | * | 5/2009  | Wang et al. .................... 345/173 |
| 2009/0295692 | A1 | * | 12/2009 | Lee et al. ......................... 345/87 |

* cited by examiner

*Primary Examiner* — Joseph Haley
*Assistant Examiner* — Linh N Hoffner
(74) *Attorney, Agent, or Firm* — WPAT, P.C.; Anthony King

(57) ABSTRACT

A liquid crystal display apparatus with touch input function includes a display unit coupling to a first scanning line, a touch transistor, a touch-sensing device, and a touch-detecting circuit coupling to a sensing line. The touch transistor includes a gate coupling to a second scanning line, a first terminal, and a second terminal coupling to the sensing line. The touch-sensing device includes a first conductor coupling to the first terminal of the touch transistor, a second conductor coupling to the first scanning line, and a touch conductor configured to electrically connect the first conductor and the second conductor when a sensing region of the liquid crystal display apparatus is touched.

14 Claims, 11 Drawing Sheets

LIQUID CRYSTAL DISPLAY APPARATUS WITH TOUCH INPUT FUNCTION

BACKGROUND OF THE INVENTION (A) Field of the Invention

The present invention relates to a liquid crystal display apparatus, and more particularly, to a liquid crystal display apparatus incorporating the touch input function in the liquid crystal display panel.

(B) Description of the Related Art

More and more advanced-function displays are being applied in current consumer electronic products. In particular, liquid crystal displays (LCDs) having a high-resolution color screen are more widely applied in various electronic devices, such as televisions, mobile phones, personal digital assistances (PDAs), digital cameras, desktop computer screens, and notebook computer screens. To facilitate portability and usage of these devices, the LCD touch panel to allow direct touch by the users has become a growing part of the LCD market. Conventional resistor type or capacitor type LCD touch panels, which are configured by disposing additional resistors or capacitors on the panels, determine the coordinate positions of touch-points by detecting the voltage variation at the touch positions.

However, since the resistors and capacitors are directly disposed on the panels, light transmittance through the LCD panel is decreased and the overall thickness of the LCD panel is increased. Accordingly, a touch-control LCD with detecting elements incorporated into a touch panel thereof is desired to decrease the weight and volume of the LCD and thus meets the size-reduction demand of the LCD market.

SUMMARY OF THE INVENTION

One aspect of the present invention provides a liquid crystal display apparatus incorporating the touch input function in the liquid crystal display panel such that the overall weight and volume of the liquid crystal display apparatus is reduced, which is advantageous to the thinner and lighter design as needed in the advanced display electronics. In addition, another aspect of the present invention provides a liquid crystal display apparatus incorporating the touch input function in the liquid crystal display panel to support the single touch and multi-touch input function and can be applied to the display electronics of different sizes.

A liquid crystal display apparatus with touch input function according to this aspect of the present invention comprises a first display unit coupled to a first scanning line, a touch transistor, a first touch-sensing device, and a touch-detecting circuit. The touch transistor includes a gate electrode coupled to a second scanning line, a first terminal, and a second terminal coupled to a sensing line. The first touch-sensing device includes a first conductor coupled to the first terminal of the touch transistor, a second conductor coupled to the first scanning line, and a first touch conductor configured to electrically connect the first conductor and the second conductor when a first sensing region of the liquid crystal display apparatus is touched. The touch-detecting circuit is coupled to the sensing line.

Another aspect of the present invention provides a liquid crystal display apparatus with touch input function comprising a first transparent substrate, a second transparent substrate facing the first transparent substrate, a first display unit positioned on the first transparent substrate and coupled to a first scanning line, a touch transistor positioned on the first transparent substrate, and a first touch-sensing device. The touch transistor includes a gate electrode coupled to a second scanning line, a first terminal, and a second terminal coupled to a sensing line. The first touch-sensing device includes a first conductor positioned on the first transparent substrate and coupled to the first terminal of the touch transistor, a second conductor positioned on the first transparent substrate and coupled to the first scanning line, and a first touch conductor positioned on the second transparent substrate and configured to electrically connect the first conductor and the second conductor when a first sensing region of the liquid crystal display apparatus is touched.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed might be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 1:
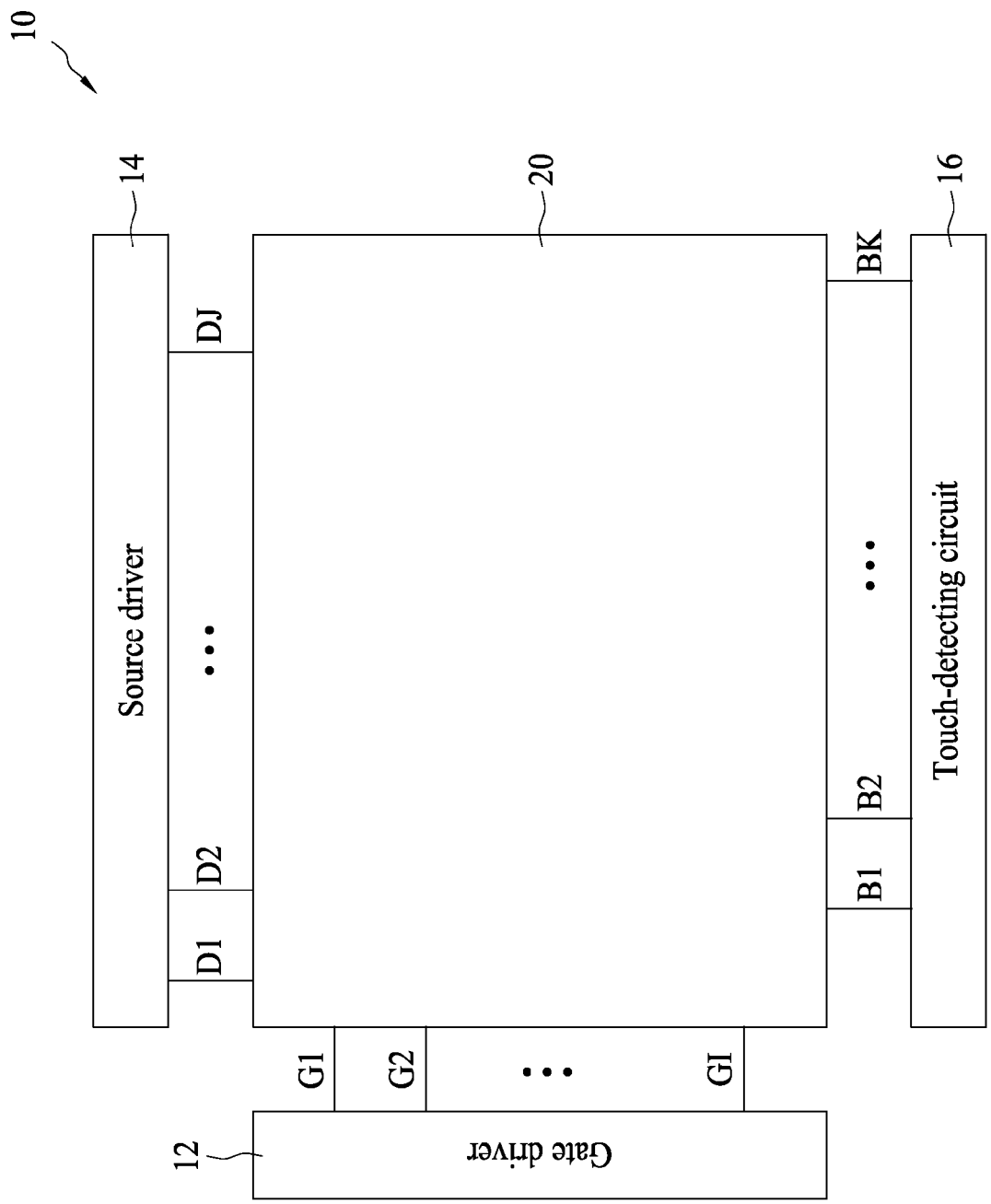
FIG. 1 illustrates a liquid crystal display apparatus with touch input function according to one embodiment of the present invention.

FIG. 1 illustrates a liquid crystal display apparatus 10 with touch input function according to one embodiment of the present invention. The liquid crystal display apparatus 10 comprises a gate driver 12, a source driver, a touch-detecting circuit, and an LCD panel 20. The gate driver 12 is configured to generate scanning signals, which are transmitted to the LCD panel 20 via a plurality of scanning lines G1-GI. The source driver 14 is configured to generate data signals, which are transmitted to the LCD panel 20 via a plurality of data lines D1-DJ. The touch-detecting circuit 16, coupled to the LCD panel 20 via a plurality of sensing lines S1-SK, is configured to detect the position of the LCD panel 20 to which a force is applied.

Figure 2:
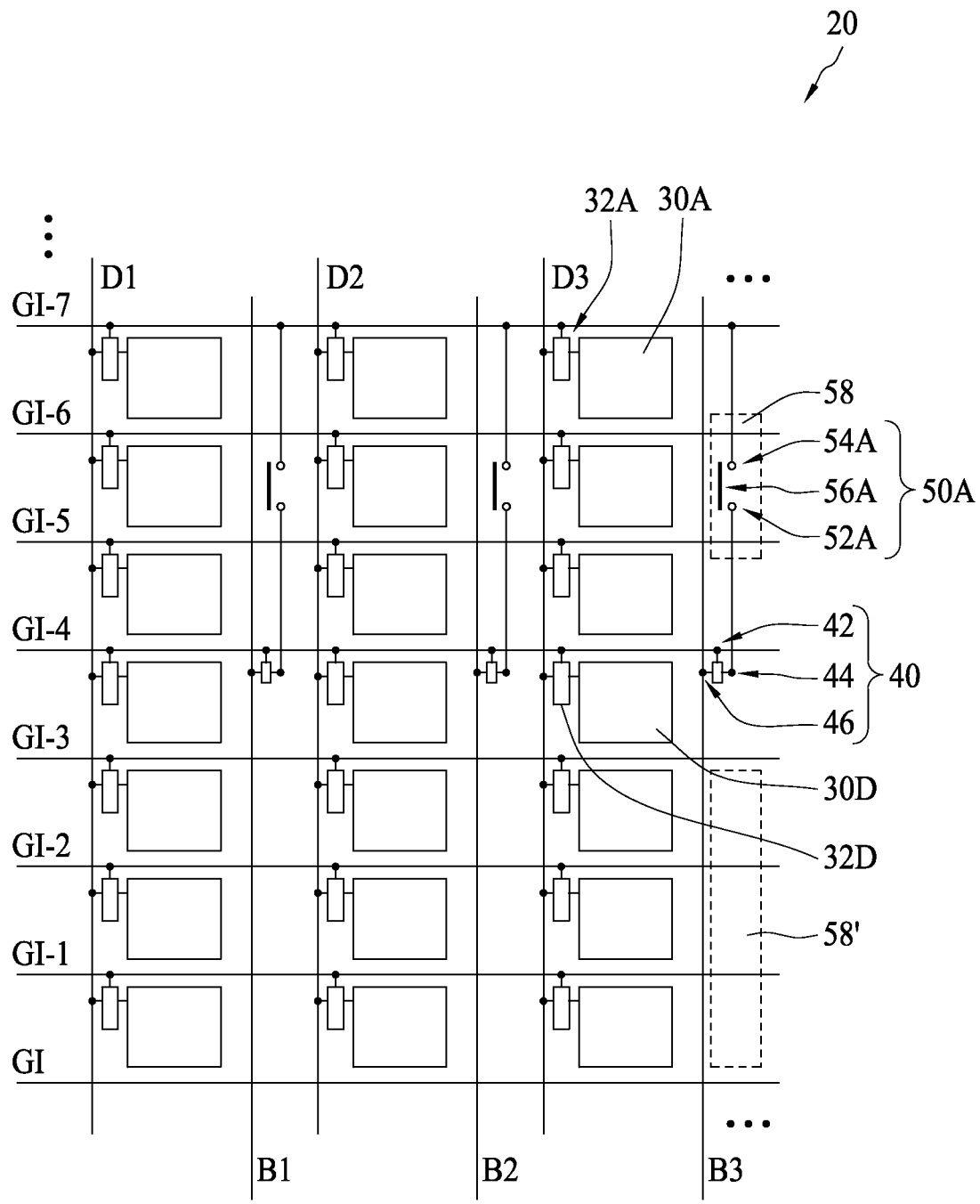
FIG. 2 illustrates an LCD panel according to one embodiment of the present invention.

FIG. 2 illustrates the LCD panel 20 according to one embodiment of the present invention. The LCD panel 20 comprises a display unit 30A, a display unit 30D, a touch transistor 40, and a touch-sensing device 50A. The display unit 30A is coupled to a scanning line GI-1 via a display transistor 32A, and the display unit 30D is coupled to a scanning line GI-4 via a display transistor 32D. The touch transistor 40 includes a gate electrode 42 coupled to the scanning line GI-4, a first terminal 44, and a second terminal 46 coupled to a sensing line B3. The touch-sensing device 50A includes a first conductor 52A coupled to the first terminal 44 of the touch transistor 40, a second conductor 54A coupled to the scanning line GI-7, and a first touch conductor 56A configured to electrically connect the first conductor 52A and the second conductor 54A when a sensing region 58 of the liquid crystal display apparatus 10 is touched.

Figure 3:
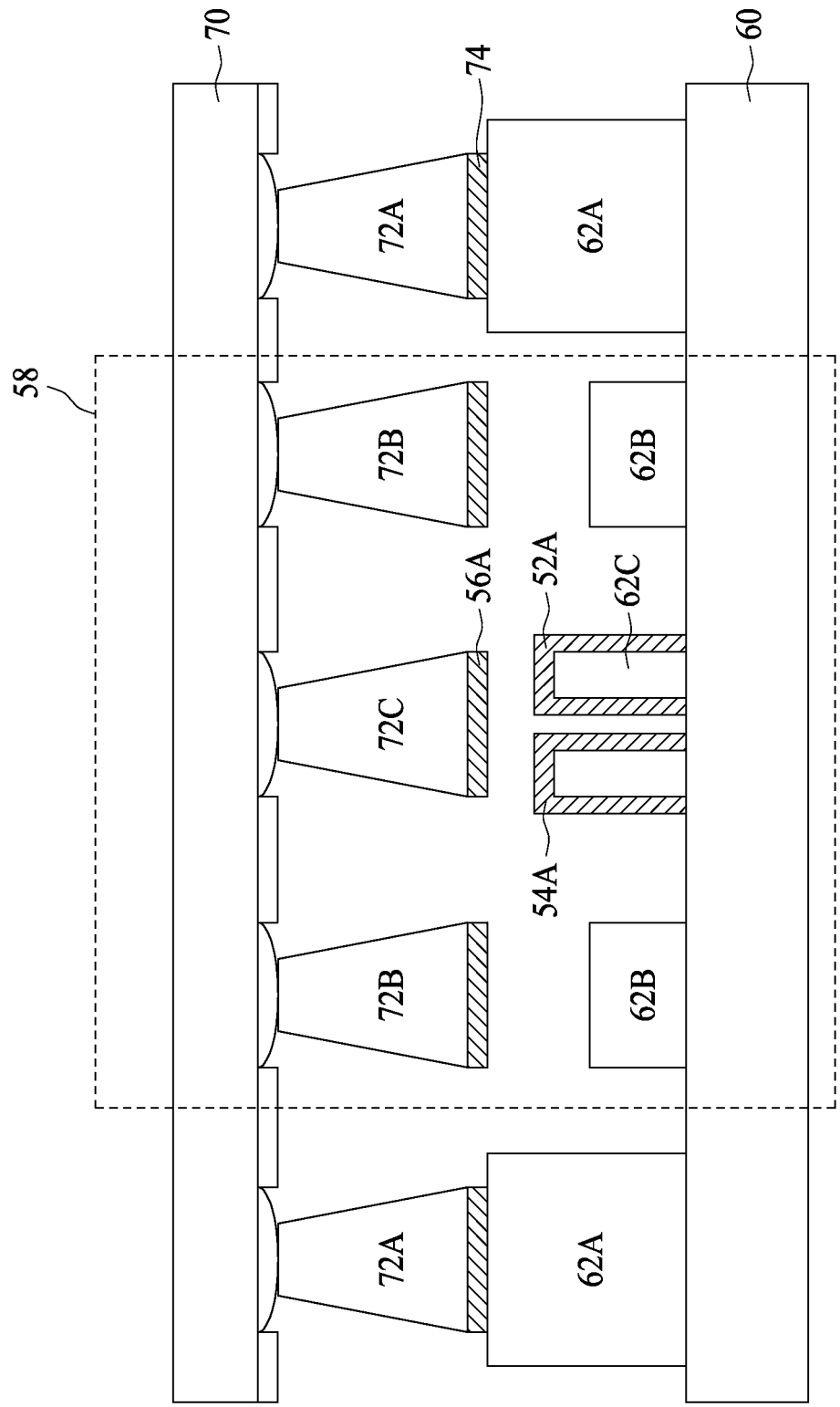
FIG. 3 and FIG. 4 illustrate the structure and touch operation of a liquid crystal display apparatus according to one embodiment of the present invention.
Figure 4:
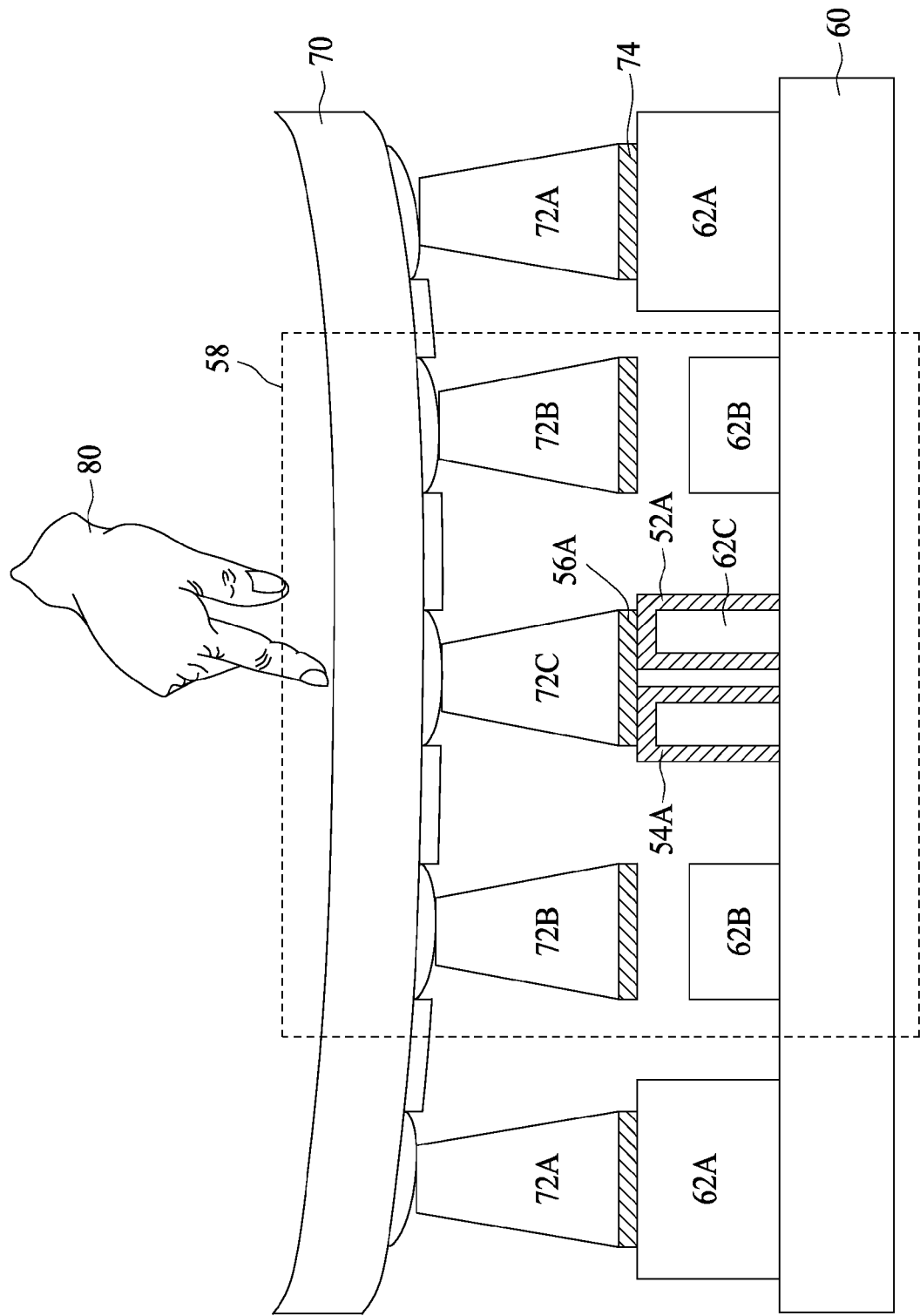
Figure 5:
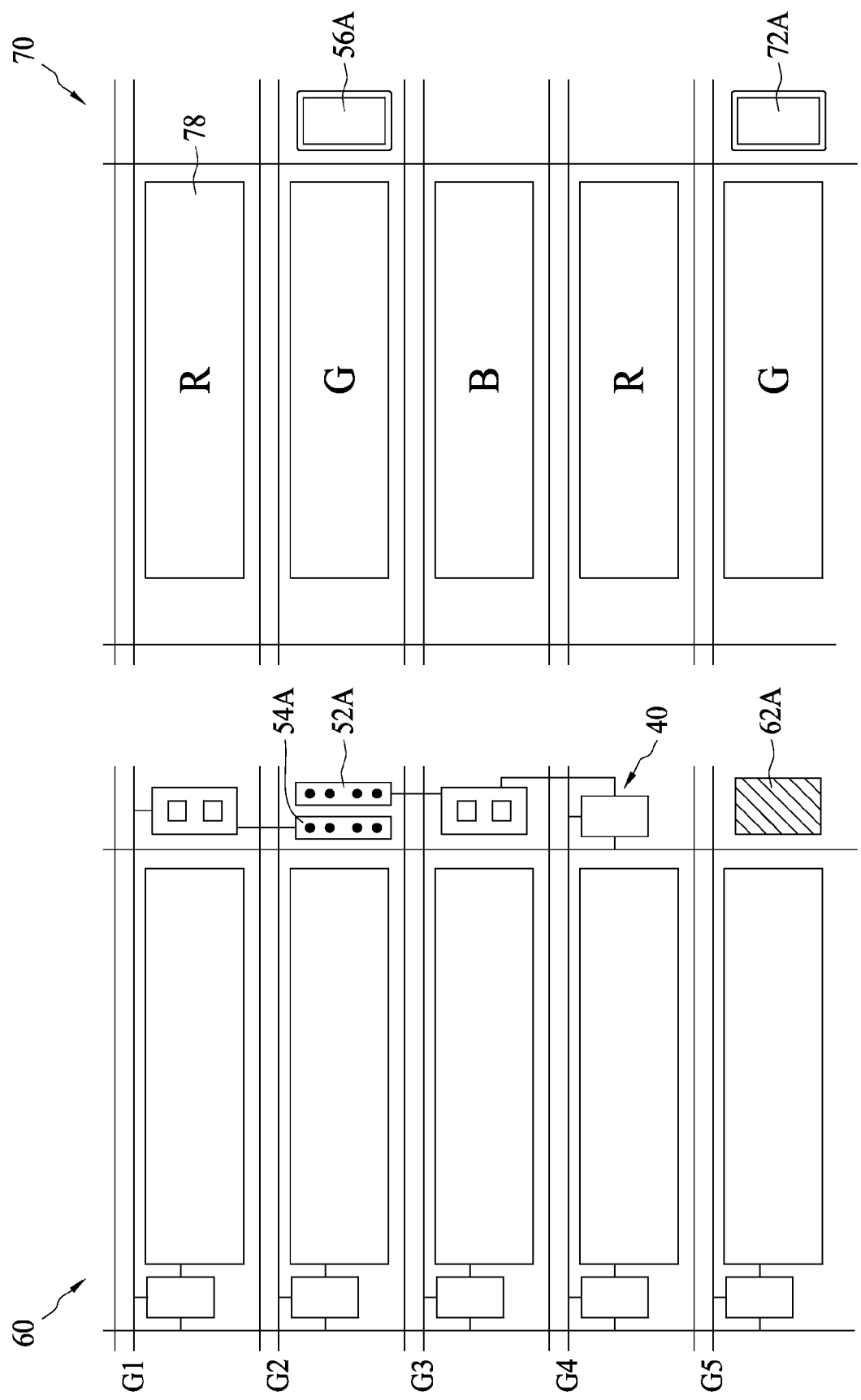
FIG. 5 illustrates a close-up layout of a liquid crystal display apparatus according to one embodiment of the present invention.

FIG. 3 and FIG. 4 illustrate the structure and touch operation of the liquid crystal display apparatus 10 according to one embodiment of the present invention, and FIG. 5 illustrates a close-up layout of the liquid crystal display apparatus 10 according to one embodiment of the present invention. The liquid crystal display apparatus 10 comprises a first transparent substrate 60 and a second transparent substrate 70 facing the first transparent substrate 60. The first transparent substrate 60 can be a glass substrate, and the LCD panel 20, the scanning lines G1-GI, the data lines D1-DJ, and the sensing lines S1-SK are formed on the first transparent substrate 60. The second transparent substrate 70 can be a glass substrate including a plurality of color filters 78, shown in FIG. 5.

Referring to FIG. 3, the first transparent substrate 60 includes a first stand 62A, a second stand 62B and a third stand 62C, and the first conductor 52A and the second conductor 54A are formed on the third stand 62C. The second stand 62B is positioned between the first stand 62A and the first conductor 52A, and the top end of the first stand 62A is higher than the top end of the second stand 62B. The second transparent substrate 70 includes a plurality of spacers 72A-72C having an end facing the first transparent substrate 60, and a conductive material 74 such as indium tin oxide (ITO) is positioned on the end. The conductive material 74 on the spacer 72C serves as the first touch conductor 56A of the touch-sensing device 50A.

FIG. 3 illustrates the touch-sensing device 50A in a non-conductive state. The first stand 62A on the first transparent substrate 60 contacts the conductive material 74 of the spacer 72A on the second transparent substrate 70. In contrast, the first touch conductor 56A of the touch-sensing device 50A does not contact the first conductor 52A and the second conductor 54A, and the spacer 72B on the second transparent substrate 70 does not contact the second stand 62B on the first transparent substrate 60.

FIG. 4 illustrates an object 80 such as a finger or pen touching the liquid crystal display apparatus 10. When the object 80 touches the sensing region 58 of the liquid crystal display apparatus 10, the first stand 62A on the first transparent substrate 60 contacts the conductive material 74 of the spacer 72A on the second transparent substrate 70, and the first touch conductor 56A of the touch-sensing device 50A contacts the first conductor 52A and the second conductor 54A to form an electrical connection. In contrast, the spacer 72B on the second transparent substrate 70 does not contact the second stand 62B on the first transparent substrate 60.

When the object 80 continuously presses the touch-sensing device 50A downward to over-press the second transparent substrate 70, the spacer 72B on the second transparent substrate 70 contacts the second stand 62B on the first transparent substrate 60 to prevent the first touch conductor 56A, the first conductor 52A and the second conductor 54A of the touch-sensing device 50A from being damaged by the over-pressing of the object 80.

Figure 6:
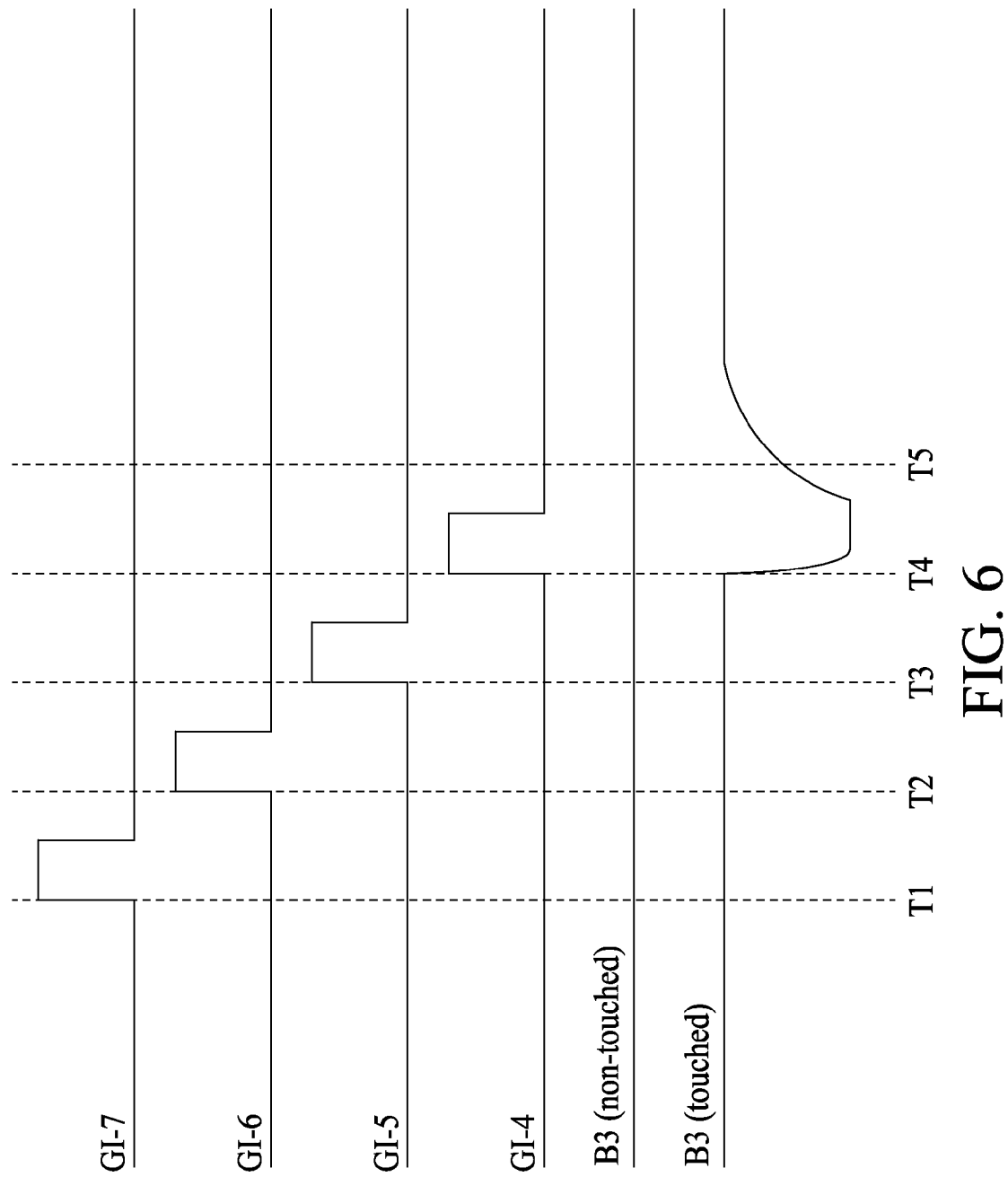
FIG. 6 illustrates the signal waveforms of the LCD panel shown in FIG. 2 according to one embodiment of the present invention.

FIG. 6 illustrates the signal waveforms of the LCD panel 20 shown in FIG. 2 according to one embodiment of the present invention. The scanning signal (high level voltage) generated from the gate driver 12 propagates via the scanning line GI-7 to turn on the display transistor 32A at T1 such that the data signal from the source driver 14 can propagate to the display unit 30A via the display transistor 32A. Subsequently, the voltage of the scanning line GI-7 drops from high level to low level to turn off the display transistor 32A. Similarly, the scanning signal generated from the gate driver 12 turns on the display transistor coupled to the scanning lines GI-6, GI-5, GI-4 in sequence. In particular, the scanning line GI-7 is a previous stage of the scanning line GI-4.

Referring to FIG. 2, the gate electrode 42 of the touch transistor 40 is coupled to the scanning line GI-4, and the touch transistor 40 is turned on at T4 by the scanning signal (high level voltage). The voltage of the sensing line B3 remains at high level during the turn-on period of the touch transistor 40 if the object 80 does not touch the sensing region 58 to electrically connect the first conductor 52A and the second conductor 54A. In contrast, the voltage of the sensing line B3 drops from high level to low level (the low level voltage of the scanning line GI-7) during the turn-on period of the touch transistor 40 if the object 80 touches the sensing region 58 such that the first touch conductor 56A electrically connects the first conductor 52A and the second conductor 54A. Subsequently, the voltage of the scanning line GI-4 drops from high level to low level to turn off the touch transistor 40, and the voltage of the sensing line B3 increase from low level to the original high level by charging.

Consequently, the touch-detecting circuit 16 can determine the lateral position of the LCD panel 20 at which the object 80 touches the panel by the variation (high level to low level) of the sensing line B3. In addition, the vertical touch position can be determined in view of the scanning line GI-4. In particular, in case several objects 80 touch the LCD panel 20 simultaneously, the liquid crystal display apparatus 10 can determine the touch positions of the objects 80 after the gate driver 12 completes the scanning of all scanning lines G1-GI in sequence, i.e., the liquid crystal display apparatus 10 possesses both the single touch and multi-touch functions. In particular, the discharging reference potential of the touch-sensing device 50A is the low level voltage of the previous scanning line GI-7 under non-scanning state, and the sensing line B3 can discharge from the high level voltage rapidly.

Referring to FIG. 2, the sensing region 58 of the touch-sensing device 50A is positioned between the scanning line GI-7 and the scanning line GI-4, i.e., the sensing region 58 is positioned in front of the touch transistor 40. There is a dead region 58' between the scanning line GI-3 and the scanning line GI. To solve this dead region 58', an additional touch-sensing device can be placed between the scanning line GI-3 and the scanning line GI, and the additional touch-sensing device is configured to electrically connect the scanning line GI to the first terminal 44 of the touch transistor 40 when it is touched.

Figure 7:
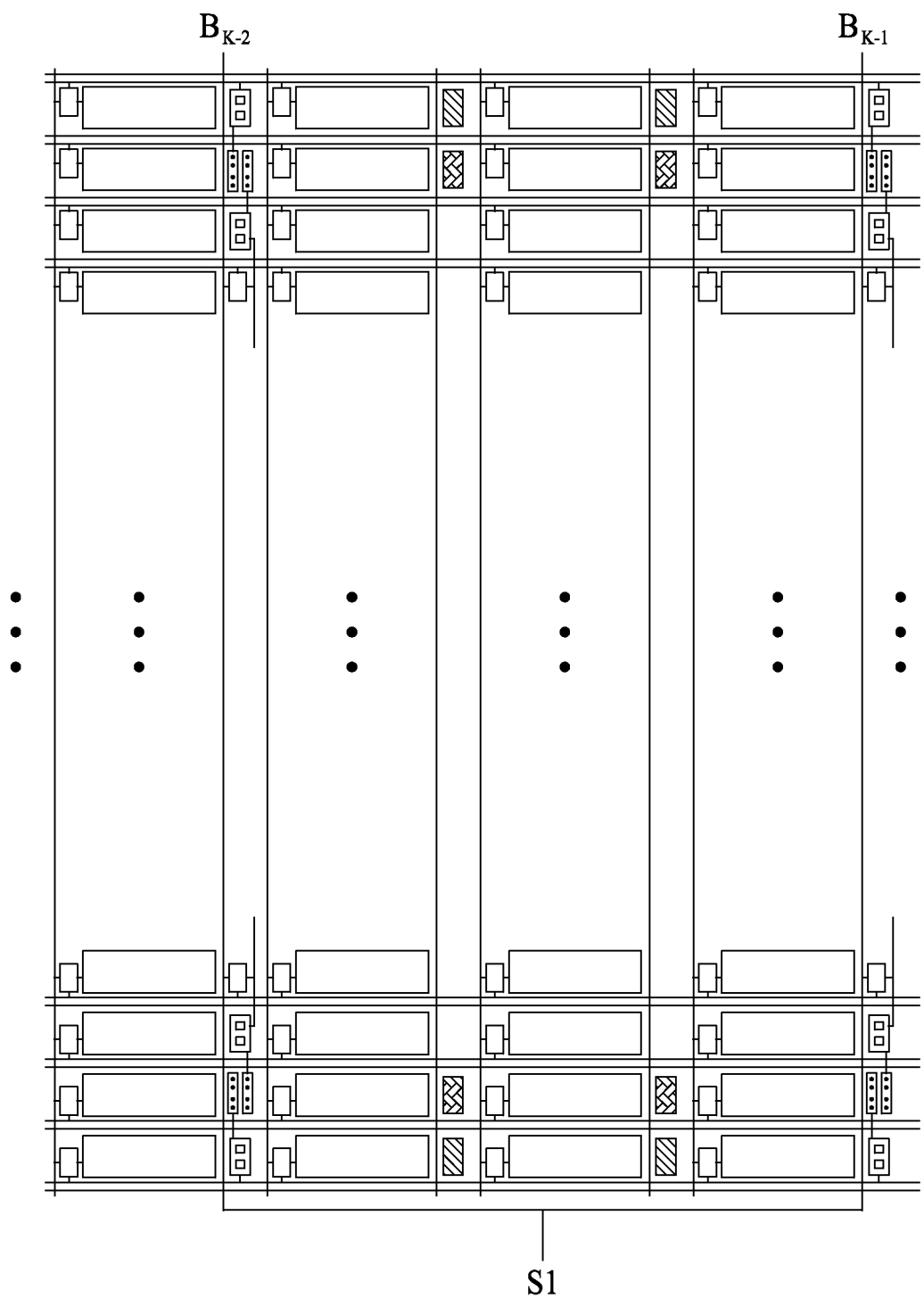
FIG. 7 and FIG. 8 illustrate a close-up layout of a first transparent substrate according to one embodiment of the present invention.
Figure 8:
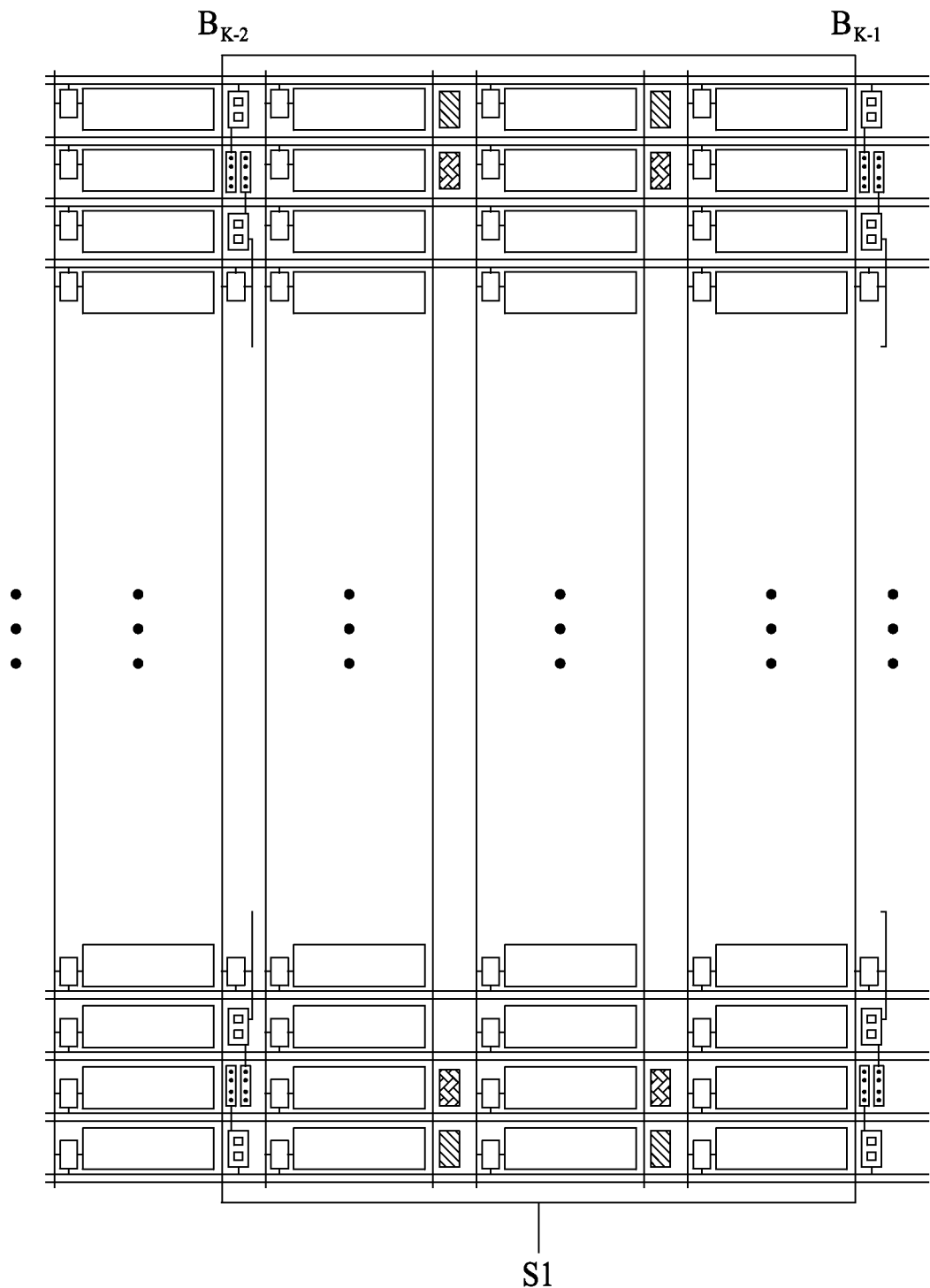

FIG. 7 and FIG. 8 illustrate a close-up layout of the first transparent substrate 60 according to one embodiment of the present invention. Referring to FIG. 7, several sensing lines, for example two sensing lines $B_{K-1}$ and $B_{K-2}$ in FIG. 7, are coupled to the touch-detecting circuit 16 via a signal channel S1, i.e., N sensing lines are connected in series or in parallel to form an effective sensing region, and N is between 1 and 10. In particular, a denser touch signal distribution increases effective touch signal data to improve the calculation precision of the touch coordinate of the algorithm dramatically. In addition, it is advantageous for improving the uniformity of the touch signal to couple the N sensing lines to the touch-detecting circuit 16 via a signal channel S1, i.e., to connect the sensing lines $B_{K-1}$ and $B_{K-2}$ to the touch-detecting circuit 16 in a many-to-one manner.

Referring to FIG. 6, after the voltage of the scanning line GI-4 drops from high level to low level to turn off the display transistor 32D, the voltage of the sensing line B3 increases from low level to the original high level by charging. The sensing lines $B_{K-1}$ and $B_{K-2}$ in FIG. 7 are charged in a one-way manner. In contrast, connecting the N sensing lines in a loop manner, for example two sensing lines $B_{K-1}$ and $B_{K-2}$ in FIG. 8, can charge the two sensing lines $B_{K-4}$ and $B_{K-2}$ in a two-way manner to dramatically reduce the charging time of the two sensing lines $B_{K-4}$ and $B_{K-2}$. In other words, connecting the N sensing lines in a loop manner can reduce the charging time of the sensing lines, and N is between 1 and 10.

Figure 9:
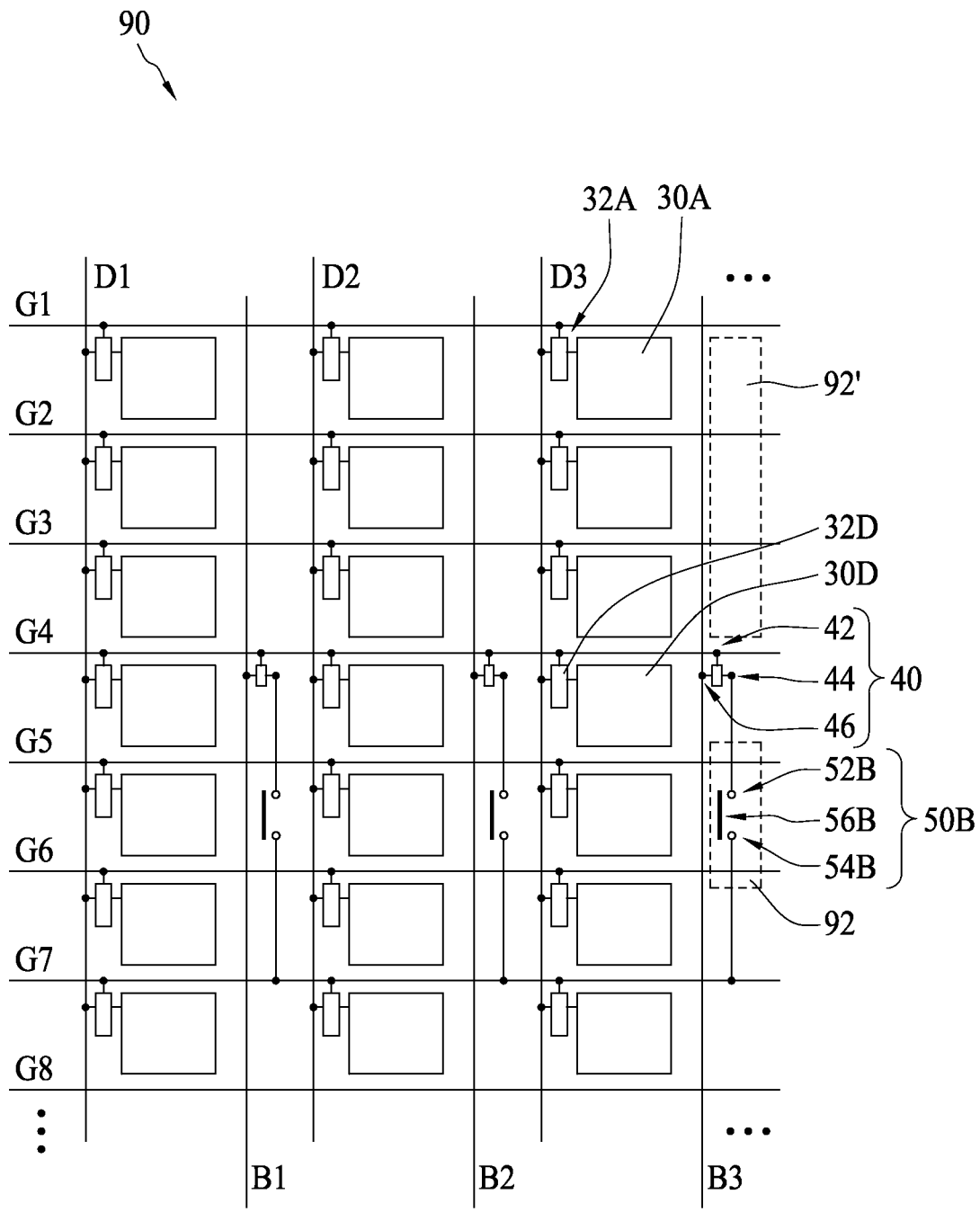
FIG. 9 illustrates an LCD panel according to another embodiment of the present invention.

FIG. 9 illustrates an LCD panel 90 according to another embodiment of the present invention. Compared to the LCD panel 20 in FIG. 2 having the touch-sensing device 50A coupling to the previous scanning line and the touch transistor 40, the LCD panel 90 in FIG. 9 includes a touch-sensing device 50B coupling to a next scanning line and the touch transistor 40. The touch-sensing device 50B includes a first conductor 52B coupled to the first terminal 44 of the touch transistor 40, a second conductor 54B coupled to a scanning line G7, and a first touch conductor 56B configured to electrically connect the first conductor 52B and the second conductor 54B when a sensing region 92 of the LCD panel 90 is touched. In particular, the scanning line G7 is a next stage of the scanning line G4.

Figure 10:
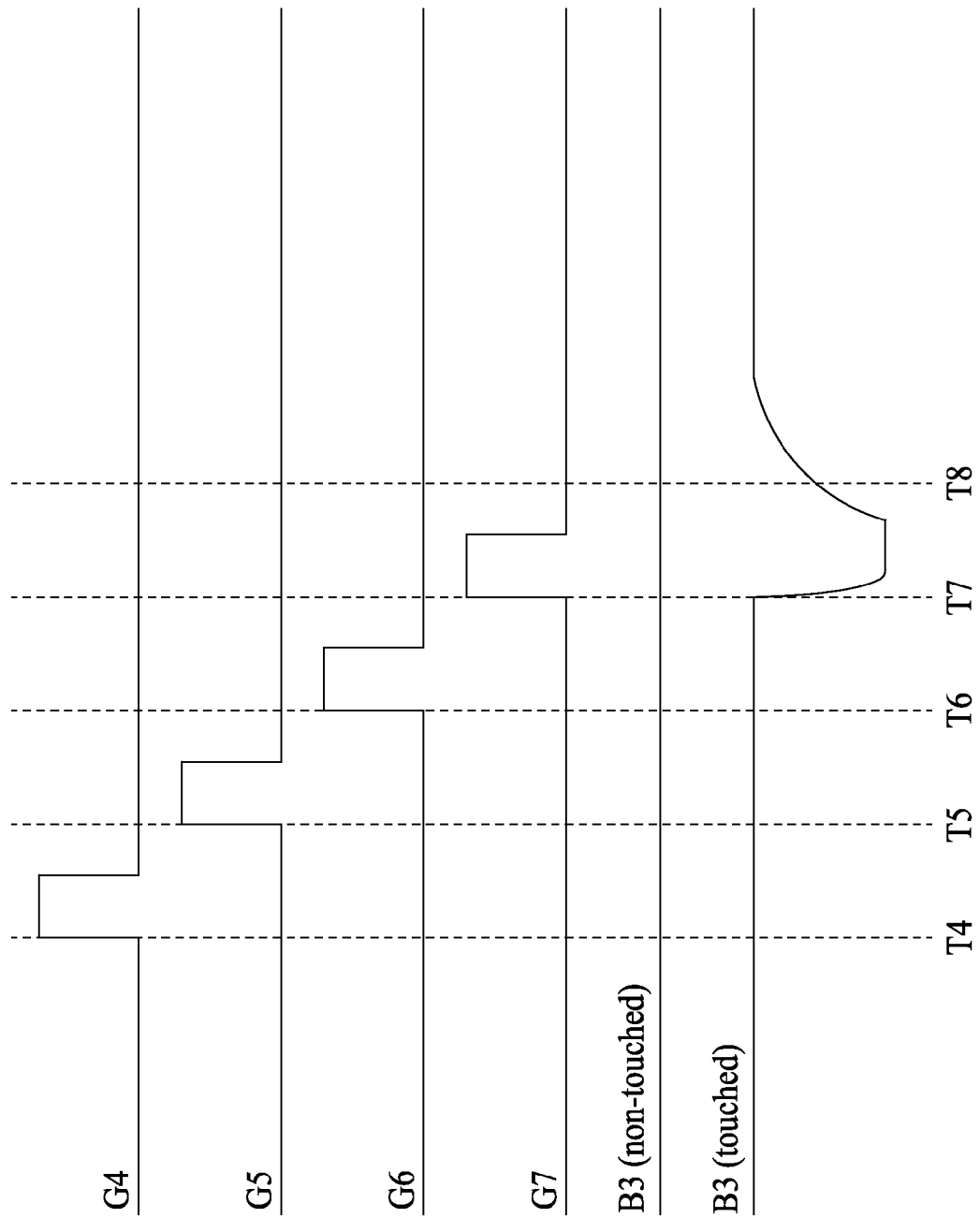
FIG. 10 illustrates the signal waveforms of the LCD panel shown in FIG. 9 according to one embodiment of the present invention.

FIG. 10 illustrates the signal waveforms of the LCD panel 90 shown in FIG. 9 according to one embodiment of the present invention. The gate electrode 42 of the touch transistor 40 is coupled to the scanning line G4, and the touch transistor 40 is turned on at T4 by the scanning signal (high level voltage). The voltage of the sensing line B3 remains at high level during the turn-on period of the touch transistor 40 if the sensing region 92 is not touched to enable to the first touch conductor 56B to electrically connect the first conductor 52B and the second conductor 54B. In contrast, the voltage of the sensing line B3 drops from high level to low level (the low level voltage of the next scanning line G7) during the turn-on period of the touch transistor 40 if the sensing region 92 is touched to enable the first touch conductor 56B to electrically connect the first conductor 52B and the second conductor 54B. Subsequently, the voltage of the scanning line G4 drops from high level to low level to turn off the touch transistor 40, and the voltage of the sensing line B3 increases from low level to the original high level by charging.

Consequently, the touch-detecting circuit 16 can determine the lateral position of the LCD panel 90 at which the object 80 touches the panel by the waveform variation (high level to low level) of the sensing line B3. In addition, the vertical touch position can be determined in view of the scanning line G4. In particular, in case several objects touch the LCD panel 90 simultaneously, the liquid crystal display apparatus 10 can determine the touch positions of the objects after the gate driver 12 completes the scanning of all scanning lines G1-GI in sequence, i.e., the liquid crystal display apparatus 10 possesses both the single touch and multi-touch functions.

Referring to FIG. 9, the sensing region 92 of the touch-sensing device 50A is positioned between the scanning line G4 and the scanning line G7, i.e., the sensing region 92 is positioned in back of the touch transistor 40. There is a dead region 92' between the scanning line G1 and the scanning line G4. To solve this dead region 92', an additional touch-sensing device can be placed between the scanning line G1 and the scanning line G4, and the additional touch-sensing device is configured to electrically connect the scanning line G1 to the first terminal 44 of the touch transistor 40 when it is touched.

Figure 11:
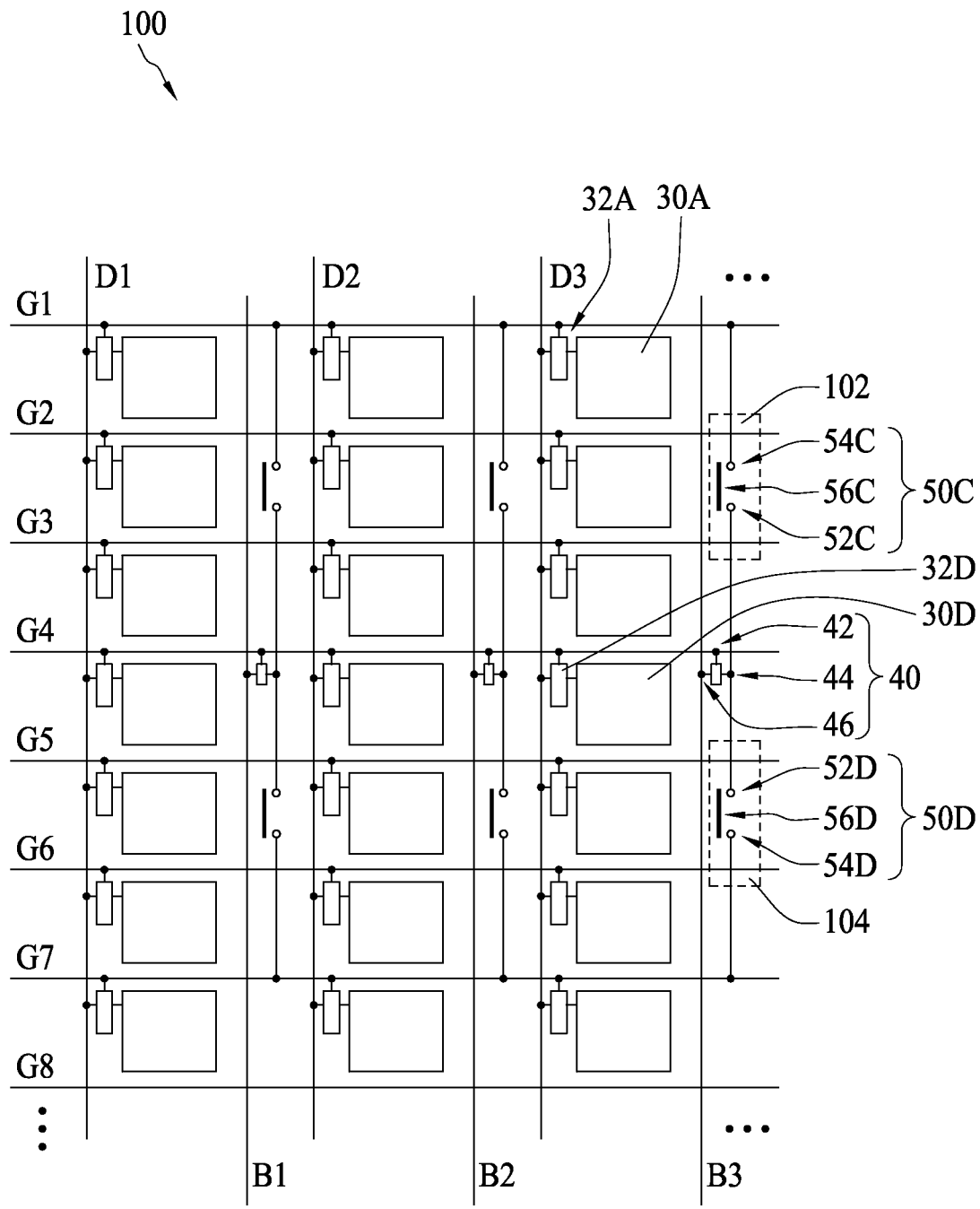
FIG. 11 illustrates an LCD panel according to another embodiment of the present invention.

FIG. 11 illustrates an LCD panel 100 according to another embodiment of the present invention. Compared to the LCD panel 20 in FIG. 2 having the touch-sensing device 50A coupling to the previous scanning line and the LCD panel 90 in FIG. 9 having the touch-sensing device 50B coupling to the next scanning line, the LCD panel 100 in FIG. 11 includes a touch-sensing device 50C coupling to a previous scanning line and a touch-sensing device 50D coupling to a next scanning line.

The touch-sensing device 50C includes a first conductor 52C coupled to the first terminal 44 of the touch transistor 40, a second conductor 54C coupled to a scanning line G1, and a first touch conductor 56C configured to electrically connect the first conductor 52C and the second conductor 54C when a sensing region 102 of the LCD panel 100 is touched. The touch-sensing device 50D includes a first conductor 52D coupled to the first terminal 44 of the touch transistor 40, a second conductor 54D coupled to a scanning line G7, and a first touch conductor 56D configured to electrically connect the first conductor 52D and the second conductor 54D when a sensing region 104 of the LCD panel 100 is touched. In particular, the scanning line G1 is a previous stage of the scanning line G4, and the scanning line G7 is a next stage of the scanning line G4.

The touch-sensing device 50A of the LCD panel 20 in FIG. 2 is coupled to the previous scanning line, and there is a dead region 58' between the scanning line GI-3 and the scanning line GI. In addition, the touch-sensing device 50B of the LCD panel 90 in FIG. 9 is coupled to the next scanning line, and there is a dead region 92' between the scanning line G1 and the scanning line G4. In contrast, the LCD panel 100 in FIG. 11 couples to the previous scanning line via the touch-sensing device 50C and couples to the next scanning line via the touch-sensing device 50D, i.e., there are touch-sensing devices both in front of and in back of the touch transistor 40, and there is no dead region in the LCD panel 100.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include

What is claimed is:

1. A liquid crystal display apparatus with touch input function, comprising:
   a first display transistor;
   a first display unit coupled to a first scanning line via the first display transistor;
   a touch transistor including a gate electrode coupled to a second scanning line, a first terminal, and a second terminal coupled to a sensing line;
   a first touch-sensing device including a first conductor coupled to the first terminal of the touch transistor, a second conductor coupled to the first scanning line and the gate of the first display transistor, and a first touch conductor configured to electrically connect the first conductor and the second conductor when a first sensing region of the liquid crystal display apparatus is touched;
   a touch-detecting circuit coupled to the sensing line, wherein a signal channel couples N sensing lines to the touch-detecting circuit, N is between 1 and 10, and the N sensing lines are connected in a loop manner;
   a second display unit coupled to a third scanning line; and
   a second touch-sensing device including a third conductor coupled to the first terminal of the touch transistor, a fourth conductor coupled to the third scanning line, and a second touch conductor configured to electrically connect the third conductor and the fourth conductor when a second sensing region of the liquid crystal display apparatus is touched.

2. The liquid crystal display apparatus with touch input function of claim 1, wherein the first scanning line is a previous stage of the second scanning line.

3. The liquid crystal display apparatus with touch input function of claim 1, wherein the first scanning line is a next stage of the second scanning line.

4. The liquid crystal display apparatus with touch input function of claim 1, wherein the first scanning line is a previous stage of the second scanning line.

5. The liquid crystal display apparatus with touch input function of claim 1, wherein the third scanning line is a next stage of the second scanning line.

6. A liquid crystal display apparatus with touch input function, comprising:
   a first display transistor;
   a first transparent substrate;
   a second transparent substrate facing the first transparent substrate;
   a first display unit positioned on the first transparent substrate and coupled to a first scanning line via the first display transistor;
   a touch transistor positioned on the first transparent substrate, the touch transistor including a gate electrode coupled to a second scanning line, a first terminal, and a second terminal coupled to a sensing line;
   a first touch-sensing device including a first conductor positioned on the first transparent substrate and coupled to the first terminal of the touch transistor, a second conductor positioned on the first transparent substrate and coupled to the first scanning line and the gate of the first display transistor, and a first touch conductor positioned on the second transparent substrate and configured to electrically connect the first conductor and the second conductor when a first sensing region of the liquid crystal display apparatus is touched, wherein a signal channel couples N sensing lines to the touch-detecting circuit, N is between 1 and 10, and the N sensing lines are connected in a loop manner;
   a second display unit coupled to a third scanning line; and
   a second touch-sensing device including a third conductor coupled to the first terminal of the touch transistor, a fourth conductor coupled to the third scanning line, and a second touch conductor positioned on the second transparent substrate and configured to electrically connect the third conductor and the fourth conductor when a second sensing region of the liquid crystal display apparatus is touched.

7. The liquid crystal display apparatus with touch input function of claim 6, wherein the first transparent substrate includes a first stand and a second stand positioned between the first stand and the first conductor.

8. The liquid crystal display apparatus with touch input function of claim 7, wherein the second transparent substrate includes a plurality of spacers having an end facing the first transparent substrate, and a conductive material positioned on the end.

9. The liquid crystal display apparatus with touch input function of claim 7, wherein the top end of the first stand is higher than the top end of the second stand.

10. The liquid crystal display apparatus with touch input function of claim 6, further comprising a color filter positioned on the second transparent substrate.

11. The liquid crystal display apparatus with touch input function of claim 6, wherein the first scanning line is a previous stage of the second scanning line.

12. The liquid crystal display apparatus with touch input function of claim 6, wherein the first scanning line is a next stage of the second scanning line.

13. The liquid crystal display apparatus with touch input function of claim 6, wherein the first scanning line is a previous stage of the second scanning line.

14. The liquid crystal display apparatus with touch input function of claim 6, wherein the third scanning line is a next stage of the second scanning line.

* * * * *